(12) United States Patent
Seibt

(10) Patent No.: US 10,189,571 B2
(45) Date of Patent: Jan. 29, 2019

(54) MODULE FOR AN AIRCRAFT CABIN WITH A SEAT FASTENED TO A DOOR

(71) Applicant: Airbus Operations GmbH, Hamburg (DE)

(72) Inventor: Christian Seibt, Hamburg (DE)

(73) Assignee: Airbus Operations GmbH (DE)

( * ) Notice: Subject to any disclaimer, the term of this patent is extended or adjusted under 35 U.S.C. 154(b) by 347 days.

(21) Appl. No.: 15/244,502

(22) Filed: Aug. 23, 2016

(65) Prior Publication Data

US 2016/0355266 A1 Dec. 8, 2016

Related U.S. Application Data

(63) Continuation of application No. PCT/EP2015/053821, filed on Feb. 24, 2015.

(30) Foreign Application Priority Data

Feb. 24, 2014 (DE) .................. 10 2014 102 378

(51) Int. Cl.
*B64D 11/06* (2006.01)
*B64D 11/02* (2006.01)
*B64D 11/00* (2006.01)

(52) U.S. Cl.
CPC .......... *B64D 11/0698* (2014.12); *B64D 11/02* (2013.01); *B64D 11/06* (2013.01); *B64D 11/0691* (2014.12); *B64D 2011/0046* (2013.01); *Y02T 50/46* (2013.01)

(58) Field of Classification Search
CPC ..... B64D 11/02; B64D 11/06; B64D 11/0691; B64D 11/00; B64D 11/04; B64D 11/0698; B64D 2011/0046; B60N 2/307; Y02T 50/46; Y10T 29/49716

See application file for complete search history.

(56) References Cited

U.S. PATENT DOCUMENTS

| 2,650,368 | A | * | 9/1953 | Evans | B64D 11/02 312/304 |
| 3,594,037 | A | * | 7/1971 | Sherman | A47C 1/036 297/14 |
| 3,898,704 | A | * | 8/1975 | Gallaher | A47C 19/205 244/118.6 |

(Continued)

FOREIGN PATENT DOCUMENTS

| DE | 10 2011 016 031 A1 | 10/2012 |
| DE | 10 2011 011 704 A1 | 12/2012 |

(Continued)

OTHER PUBLICATIONS

DE 10 2014 102 378.1 Search Report dated Nov. 6, 2014.
ISR with Written Opinion PCT/EP2015/053821 dated Apr. 15, 2015.

*Primary Examiner* — Medhat Badawi
(74) *Attorney, Agent, or Firm* — Lerner, David, Littenberg, Krumholz & Mentlik, LLP

(57) ABSTRACT

A module for an aircraft cabin and an aircraft with a passenger cabin and such a module where the module includes a door to open the module, and a seat that is fastened to the door. The seat can be a vehicle attendant seat, and the module can be a lavatory. The rear side of the module can nestle against the pressure bulkhead in the tail of the aircraft. The module can include another module directly adjacent to its side, e.g., a galley module.

13 Claims, 10 Drawing Sheets

(56) References Cited

U.S. PATENT DOCUMENTS

| | | | | |
|---|---|---|---|---|
| 4,679,749 A * | 7/1987 | Ryan | B64D 11/06 | 244/122 R |
| 4,740,030 A * | 4/1988 | Nordskog | A47C 9/06 | 16/289 |
| 4,799,632 A * | 1/1989 | Baymak | B64D 11/0691 | 244/122 R |
| 4,832,404 A * | 5/1989 | Baymak | B64D 11/0691 | 280/808 |
| 4,902,069 A * | 2/1990 | Lehnert | B64D 11/0691 | 297/14 |
| 4,913,487 A * | 4/1990 | Breckel | A47C 9/06 | 297/14 |
| 4,993,666 A * | 2/1991 | Baymak | B09B 1/00 | 244/122 R |
| 5,133,587 A * | 7/1992 | Hadden, Jr. | B60N 2/4214 | 297/146 |
| 5,180,120 A * | 1/1993 | Simpson | B64D 11/0693 | 244/118.6 |
| 5,335,963 A * | 8/1994 | Muller | B60N 2/3047 | 297/14 |
| 5,383,629 A * | 1/1995 | Morgan | B64D 11/00 | 244/118.6 |
| 5,707,103 A * | 1/1998 | Balk | B60N 2/01583 | 297/13 |
| 6,000,659 A * | 12/1999 | Brauer | B64D 11/00 | 244/118.5 |
| 6,007,025 A * | 12/1999 | Coughren | B64D 11/02 | 105/329.1 |
| 6,079,669 A * | 6/2000 | Hanay | B64D 11/02 | 244/118.5 |
| 6,152,400 A * | 11/2000 | Sankrithi | B64D 11/00 | 105/315 |
| 6,227,489 B1 * | 5/2001 | Kitamoto | B64D 11/00 | 244/118.5 |
| 6,273,366 B1 * | 8/2001 | Sprenger | A61G 3/00 | 244/118.1 |
| 6,302,358 B1 * | 10/2001 | Emsters | B64C 1/20 | 244/137.1 |
| 6,460,922 B1 * | 10/2002 | Demick | B60N 2/3034 | 296/65.11 |
| 6,474,599 B1 * | 11/2002 | Stomski | B64C 1/1469 | 109/68 |
| 6,604,709 B1 * | 8/2003 | Wentland | B64D 11/00 | 244/117 R |
| 6,615,421 B2 * | 9/2003 | Itakura | B64D 11/02 | 244/118.5 |
| 6,696,979 B2 * | 2/2004 | Manten | B64C 1/1469 | 180/287 |
| 6,846,044 B2 * | 1/2005 | Moffa | B60N 2/3043 | 297/14 |
| 7,108,226 B2 * | 9/2006 | Quan | B64D 11/06 | 244/118.6 |
| 7,201,349 B2 * | 4/2007 | Lavie | A61G 3/001 | 244/118.5 |
| 7,399,031 B2 * | 7/2008 | Gardner | B60P 3/39 | 297/1 |
| 7,780,114 B2 * | 8/2010 | Doebertin | B64D 11/04 | 244/118.5 |
| 7,966,952 B2 * | 6/2011 | Fissette | B64D 11/0007 | 108/115 |
| 8,118,365 B2 * | 2/2012 | Henshaw | B60N 2/242 | 297/245 |
| 8,152,101 B2 * | 4/2012 | Law | B64D 11/06 | 244/118.5 |
| 8,215,695 B2 * | 7/2012 | Ida | B60N 2/01583 | 296/65.03 |
| 8,485,470 B2 * | 7/2013 | Hankinson | B64D 11/06 | 244/118.6 |
| 8,506,222 B2 * | 8/2013 | Reid | B23P 9/025 | 411/108 |
| 8,691,037 B2 * | 4/2014 | Ingram, Jr. | B29C 53/587 | 156/189 |
| 8,746,315 B2 * | 6/2014 | Barlag | B29C 70/541 | 156/560 |
| 8,770,659 B2 * | 7/2014 | Isherwood | B64D 11/0691 | 297/14 |
| 9,045,230 B2 * | 6/2015 | Burrows | B64D 11/0691 | |
| 9,145,209 B2 * | 9/2015 | Weitzel | B64D 11/06 | |
| 9,260,190 B2 * | 2/2016 | Ehlers | B64D 11/06 | |
| 9,346,548 B2 * | 5/2016 | Schliwa | B64D 11/02 | |
| 9,376,211 B2 * | 6/2016 | Schliwa | B64D 11/02 | |
| 2002/0070314 A1 | 6/2002 | Schmidt-Schaeffer | B60N 2/01 | 244/118.6 |
| 2004/0232283 A1 * | 11/2004 | Ferry | B60N 2/206 | 244/118.6 |
| 2005/0023413 A1 * | 2/2005 | Saint-Jalmes | B64D 11/00 | 244/118.6 |
| 2005/0230550 A1 * | 10/2005 | Dominguez | B64C 1/1469 | 244/129.5 |
| 2006/0058107 A1 * | 3/2006 | Dobertin | A63H 33/008 | 472/92 |
| 2007/0018046 A1 * | 1/2007 | Boren | B64D 11/04 | 244/118.6 |
| 2007/0102577 A1 * | 5/2007 | Saint-Jalmes | B64D 11/00 | 244/118.6 |
| 2007/0102579 A1 * | 5/2007 | Krieglsteiner | B64D 11/00 | 244/129.1 |
| 2007/0152100 A1 * | 7/2007 | Saint-Jalmes | B64D 11/06 | 244/118.6 |
| 2007/0241232 A1 * | 10/2007 | Thompson | B64D 11/02 | 244/118.6 |
| 2007/0295863 A1 * | 12/2007 | Thompson | B60N 2/01 | 244/118.6 |
| 2009/0146004 A1 * | 6/2009 | Plant | B64D 11/06 | 244/118.5 |
| 2009/0206200 A1 * | 8/2009 | Bolder | B64D 25/16 | 244/118.5 |
| 2009/0261200 A1 * | 10/2009 | Saint-Jalmes | B64D 11/04 | 244/118.5 |
| 2009/0302156 A1 * | 12/2009 | Saint-Jalmes | A61G 3/001 | 244/118.6 |
| 2010/0181425 A1 * | 7/2010 | Guering | B64D 11/00 | 244/118.5 |
| 2010/0219292 A1 * | 9/2010 | Saint-Jalmes | B64D 11/0023 | 244/118.5 |
| 2011/0114788 A1 * | 5/2011 | Mosler | B64D 11/0023 | 244/118.5 |
| 2011/0273849 A1 * | 11/2011 | Jaeger | B64D 11/04 | 361/725 |
| 2012/0041619 A1 * | 2/2012 | Rudduck | B64D 11/00 | 701/3 |
| 2013/0001359 A1 * | 1/2013 | Schliwa | B64D 11/02 | 244/118.6 |
| 2013/0105627 A1 * | 5/2013 | Orson | B64D 11/00 | 244/118.5 |
| 2013/0126671 A1 * | 5/2013 | Guering | B64D 11/06 | 244/118.6 |
| 2013/0206904 A1 * | 8/2013 | Gee | B64D 11/02 | 244/118.5 |
| 2013/0206907 A1 * | 8/2013 | Burrows | B64D 11/02 | 244/118.5 |
| 2013/0256456 A1 * | 10/2013 | Malek | B64D 11/00 | 244/118.6 |
| 2013/0313365 A1 * | 11/2013 | Ehlers | B64D 11/06 | 244/118.6 |
| 2014/0008492 A1 * | 1/2014 | Ehlers | B64D 11/02 | 244/118.5 |
| 2014/0027572 A1 * | 1/2014 | Ehlers | B64D 11/06 | 244/118.6 |
| 2014/0048650 A1 * | 2/2014 | Schliwa | B64D 11/00 | 244/118.5 |
| 2014/0125092 A1 * | 5/2014 | Schreuder | B64D 11/00 | 297/163 |
| 2014/0166808 A1 * | 6/2014 | Boenning | B64D 11/06 | 244/118.6 |

(56) References Cited

U.S. PATENT DOCUMENTS

| | | | | |
|---|---|---|---|---|
| 2014/0209741 A1* | 7/2014 | Boenning | | B64D 11/06 244/118.6 |
| 2014/0224931 A1* | 8/2014 | Weitzel | | B64D 11/06 244/118.6 |
| 2014/0232153 A1* | 8/2014 | Bell | | B29C 70/545 297/232 |
| 2014/0312173 A1* | 10/2014 | Ehlers | | B64D 11/06 244/118.6 |
| 2014/0319274 A1* | 10/2014 | Lieven | | B64C 1/00 244/118.5 |
| 2014/0319275 A1* | 10/2014 | Najd | | B64D 11/02 244/118.6 |
| 2014/0321947 A1* | 10/2014 | Speller | | B64C 1/403 411/511 |
| 2014/0326829 A1* | 11/2014 | Ehlers | | B64D 11/0691 244/118.6 |
| 2014/0333100 A1* | 11/2014 | Wilkens | | B64D 11/0644 297/163 |
| 2014/0339360 A1* | 11/2014 | Moje | | B64D 11/00 244/118.5 |
| 2014/0339361 A1* | 11/2014 | Moje | | B64D 11/0691 244/118.5 |
| 2014/0339362 A1* | 11/2014 | Moje | | B64D 11/0691 244/118.5 |
| 2014/0339363 A1* | 11/2014 | Moje | | B64D 11/00 244/118.5 |
| 2014/0339364 A1* | 11/2014 | Ehlers | | B64D 11/00 244/118.6 |
| 2014/0375086 A1* | 12/2014 | Schliwa | | B64D 11/0691 297/14 |
| 2015/0054323 A1* | 2/2015 | Mastrolia | | B64D 25/10 297/313 |
| 2015/0166182 A1* | 6/2015 | Ducreux | | B64D 11/06 244/118.6 |
| 2015/0300054 A1* | 10/2015 | Seibt | | B64D 11/02 244/118.5 |
| 2016/0145845 A1* | 5/2016 | Seibt | | E03D 9/031 422/4 |
| 2016/0355266 A1* | 12/2016 | Seibt | | B64D 11/02 |
| 2017/0106983 A1* | 4/2017 | Castanos | | B64D 11/0691 |
| 2017/0129612 A1* | 5/2017 | Seibt | | B64D 11/0691 |

FOREIGN PATENT DOCUMENTS

| | | |
|---|---|---|
| DE | 10 2011 116 521 A1 | 4/2013 |
| EP | 0 867 365 A2 | 9/1998 |
| EP | 2 690 016 A2 | 1/2014 |
| EP | 2 724 938 A1 | 4/2014 |
| WO | 2012/110643 A1 | 8/2012 |
| WO | 2014/071335 A1 | 5/2014 |

* cited by examiner

MODULE FOR AN AIRCRAFT CABIN WITH A SEAT FASTENED TO A DOOR

CROSS-REFERENCE TO RELATED APPLICATIONS

This application is a continuation of International Application No. PCT/EP2015/053821 filed Feb. 24, 2015, published on Aug. 27, 2015, which claims priority from German Patent Application No. 10 2014 102 378.1 filed Feb. 24, 2014, all of which are incorporated herein by reference.

FIELD OF THE INVENTION

The invention relates to a module for an aircraft cabin with a door and a seat, and further to an aircraft with a passenger cabin and such a module.

BACKGROUND OF THE INVENTION

One objective when equipping aircraft cabins is to accommodate the highest possible number of passengers, without significantly reducing the comfort of individual passengers in the process. As a rule, the number of flight attendant seats and lavatories will rise along with the number of passenger seats. Therefore, it is advantageous to accommodate as many flight attendant seats and lavatories as possible in as confined a space as possible.

DE 10 2011 011 704 A1 describes a lavatory configuration for a means of transportation that comprises a first lavatory, a second lavatory adjacent thereto, and a partition situated between the first lavatory and second lavatory. The partition is movably mounted, and designed to be moved into an opening position, which removes the separation between the first lavatory and second lavatory.

US 2013/001359 A1 describes a modular cabin segment with a first lateral segment module that houses a first lavatory configuration with at least one lavatory. The cabin segment further comprises a second lateral segment module, wherein at least one of the modules comprises a vehicle attendant seat mounted to the at least one module so that it can unilaterally pivot around a vertical axis.

BRIEF SUMMARY OF THE INVENTION

An aspect of the invention proposes an alternative configuration for a vehicle attendant seat.

It is proposed that a module for an aircraft cabin be provided that comprises a door to open the module, and a seat that is fastened to the door. In this way, the seat is arranged in an alternative manner by comparison to prior art. The seat can be a vehicle attendant seat (so-called cabin attendant seat or CAS), and the module can be a lavatory. The CAS is also referred to as a Standard CAS, and can be a defined modular unit not to be adapted, which is fastened to the door via mechanical interfaces, and comprises among other things a seat or folding seat hinged to the Standard CAS modular unit. The possible advantage to this configuration is that less space is used overall for the vehicle attendant seat and lavatory. This leaves more space for a larger number or more generous distribution of passenger seats.

The module can be a urinal, a washroom, a closet, a stowage space, a relaxation room, a staircase or the like. The module can comprise fasteners for the seat.

According to an embodiment of the invention, the seat is a folding seat, which can be swiveled from an essentially perpendicular stowage position into an essentially horizontal operating position. The seat can comprise just a seat surface, but also a backrest and/or headrest. The hinge between the door of the module and the seat can essentially run horizontally or parallel to the floor.

In an embodiment, the seat can be recessed essentially completely into the door when in the stowage position. This keeps the space in front of the door, e.g., an aisle passageway, as open and easily traversable as possible. The seat can also be only partially recessed into the door or not at all when in the stowage position. Also possible is a structure between the door and seat that accommodates a portion of the seat in the stowage position. In a space not occupied by the seat, e.g., above the seat, the door can comprise a compartment, e.g., a storage compartment. The storage compartment can be accessible from the inside of the module or from outside.

In an embodiment, the door comprises a hinge component, e.g., for interacting with another hinge component secured to a wall of the module or a wall of the adjacent module. The hinge components are preferably distributed along the entire height of the door, so as to convey the torque from the total weight to of the door, seat and possibly seated user to the wall as uniformly as possible.

The seat can be laterally displaced from the center of the door in the direction of the hinge component, thereby minimizing the lever arm of the weight of the seat (and possibly a person seated thereon), and thus the resulting torque on the hinge. For example, a weight of the seat ranging from 10 to 20 kg and a weight of the person measuring up to 100 kg is taken as the basis. Another advantage to the eccentric configuration of the seat relative to the door is that a seated flight attendant can keep an eye on the passengers (so-called direct view), and other modules and fixtures of the aircraft cabin do not block the line of sight.

In an advantageous embodiment, the side of the door opposite the hinge components, i.e., the free longitudinal side of the door, can have an acute, beveled or triangular taper. The hinge side of the door opposite the hinge component preferably tapers acutely. However, it is also possible for the side of the door opposite the hinge component to comprise a distinctly smaller thickness than the side of the door lying in the area of the hinge component without the door having an acute, beveled or triangular taper. The advantage to this is that more space remains open and thus easily traversable in front of the door, for example an aisle passageway. Door components, such as door locks, can be adjusted to the existing installation space and in terms of ergonomics. The accessibility of a doorknob lock or door handle lock can be adjusted by lengthening the rotational axis of the doorknob lock so that it corresponds approximately to a mounting depth of the flight attendant seat or CAS.

For purposes of weight reduction or reinforcement, the door can comprise ribbed stiffeners and/or recesses, for example. Based on his or her knowhow, the skilled person can adjust the stiffeners and/or recesses commensurate to the operating conditions, and distribute them in the door.

To improve handling, the door can comprise an actuating element (e.g., doorknob or handle) and/or a locking element (e.g., lock or bolt) and/or a damper. The actuating element and/or a locking element can be situated in a recessed grip. The door can comprise one or more locking mechanisms, which can be actuated only from inside, only from outside, or from both sides, and also an emergency and/or self-locking mechanism. The door can be unhinged and replaced by another door.

According to an embodiment of the invention, the module comprises a locking mechanism, in particular a taxi/take-off/landing (TTL) locking mechanism, which is designed to only allow the seat to swivel from the essentially perpendicular stowage position into the essentially horizontal operating position if the door is locked.

This ensures that a person can only sit down on the seat if the door is locked. Correspondingly, the locking mechanism also ensures that the seat can be folded or swiveled out when the door is locked. For example, the seat can be occupied by a flight attendant during take-off or landing, since the module is not in use at this point in time anyway, so that the door of the module can remain locked.

The locking mechanism can comprise a lever, for example in the form of a control lever of the kind that can be used in the area of an onboard kitchen (so-called galley) to secure a serving cart (so-called trolley) in the stowage position, so that the seat can be swiveled out when actuating the lever after the door has been locked. Let it be noted that the lever can be a TTL lever (taxi/take-off/landing lever). Such a control lever is typically used for galleys, for example, and can be configured with a spring-loaded system for travel limitation. For example, the lever or control lever can be moved from the open to the closed state by a ¼ rotation or 90° rotation. The travel in the form of a ¼ rotation from the open to the closed state and vice versa can also be achieved with other systems, for example a pre-tensioned, movable rotational axis of the control lever and stop position points that can secure the control lever in a groove. The groove can consist of a ramp and limit stop.

In the locked position of the lever, the door is unlocked, so that the seat cannot be swiveled out. Accordingly, the seat cannot be moved into the essentially horizontal operating position when the lever is in the locked position.

From the locked to the unlocked position of the lever, the door can be closed, and secured by a door lock or door locking mechanism, for example. Only with the door in the closed door position can the seat be folded down in the exemplary configuration next to a projecting adjacent module.

In the unlocked position of the lever, the door is additionally locked or cannot be opened, thereby enabling the seat to be swiveled out. Accordingly, the seat can be moved into the essentially horizontal operating position when the lever is in the unlocked position. This correlation will be explained in even more detail in the description to the figures.

In addition, at least one side of the door can be provided with one or more journals or locking pins, e.g., which can engage into recesses in the accompanying wall, similarly to a bank vault. Furthermore, the door can comprise a final lock, e.g., via the lever, which preferably also visually displays the locking state of the door. It is also preferred that the seat can only be moved into the operating state after the door has been locked by the final lock.

The used hinge component, the used locking element, the actuating element, the wall and/or the door can basically be reinforced relative to corresponding usual structural elements, so as to resist the influence exerted by the weight of the seat (and possibly a person seated thereon), even in the case of emergency landings, during which accelerations of 16 g can be dynamically encountered.

The actuating element, the locking element, the hinge components, the lever and/or the shock absorber can be completely or partially recessed or integrated into the door, so as to economize on additional space and minimize the risk of injury.

In addition, the invention relates to an aircraft with a passenger cabin and a module according to the above description. The aircraft can comprise a further, additional module, e.g., a galley module. Both modules can be laterally situated directly next to each other, preferably on the side of the module where the hinge component is located. More space is economized in this way.

In an embodiment, the further, additional module (e.g., galley module) projects at least partially relative from the module (lavatory module). The projection of a baking sheet, for example, from the galley module is made possible by integrating the seat into the door.

All mentioned components can be fabricated out of known materials commonly used in lightweight construction, e.g., aluminum, sheet steel, plastic and composite material.

BRIEF DESCRIPTION OF THE DRAWINGS

Additional features, advantages and possible applications for the present invention may be gleaned from the following description of exemplary embodiments and the figures. All described and/or graphically depicted features here comprise the subject matter of the invention whether taken in isolation or in any combination, even regardless of their composition in the individual claims or back references thereto. The same reference numbers on the figures stand for the same or similar objects.

DETAILED DESCRIPTION

Figure 1:
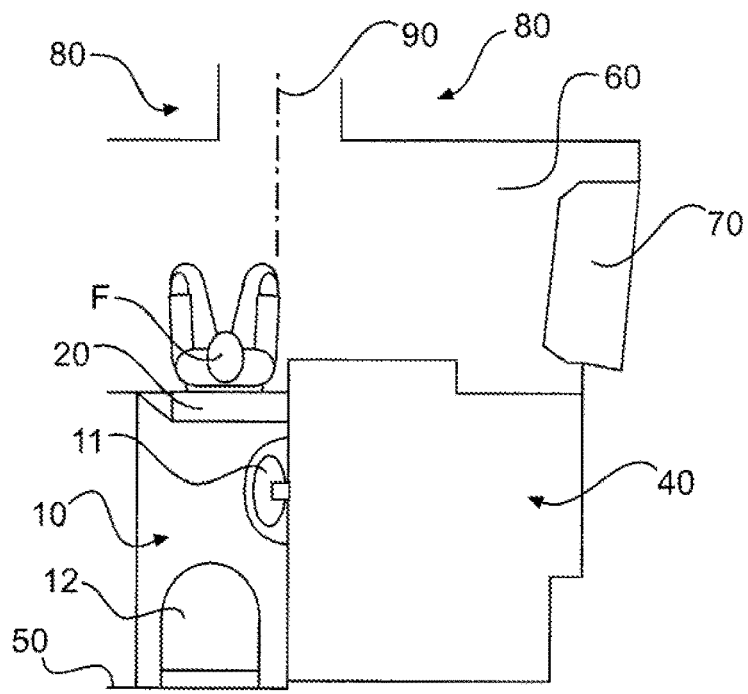
FIG. 1 shows a top view of part of a passenger cabin of an aircraft with a module in a schematic representation, wherein a user is seated.

FIG. 1 shows a top view of part of a passenger cabin of an aircraft with a module 10. The module 10 is a lavatory module with a washbasin 11, a lavatory 12 and a door 20 for opening the module 10. However, the module 10 can also be a storage cabinet. The door 20 has secured to it a seat 30 (not visible), on which a flight attendant F is seated, for example. Located next to the module 10 is another module 40, e.g., which can be an onboard kitchen module (galley). The backs of both modules 10, 40 are nestled against a pressure bulkhead 50 in the tail of the aircraft. Situated in front of the modules 10, 40 is an aisle 60, which on FIG. 1 is bounded on the right side by an exit door 70. Additional fixtures 80 of the passenger cabin (e.g., additional lavatory modules) are located in front of the door 20 with the seat 30. The aisle runs between the additional fixtures 80 to the rows of passenger seats (not shown).

Another advantage to the eccentric arrangement of the seat 30 relative to the door 20 is that a seated flight attendant F can keep an eye on the passengers (direct view), and other modules and fixtures 80 of the aircraft cabin do not block the line of sight. In particular, the hinge area of the door 20 lies in the area of the longitudinal axis 90 of the aircraft.

Figure 2:
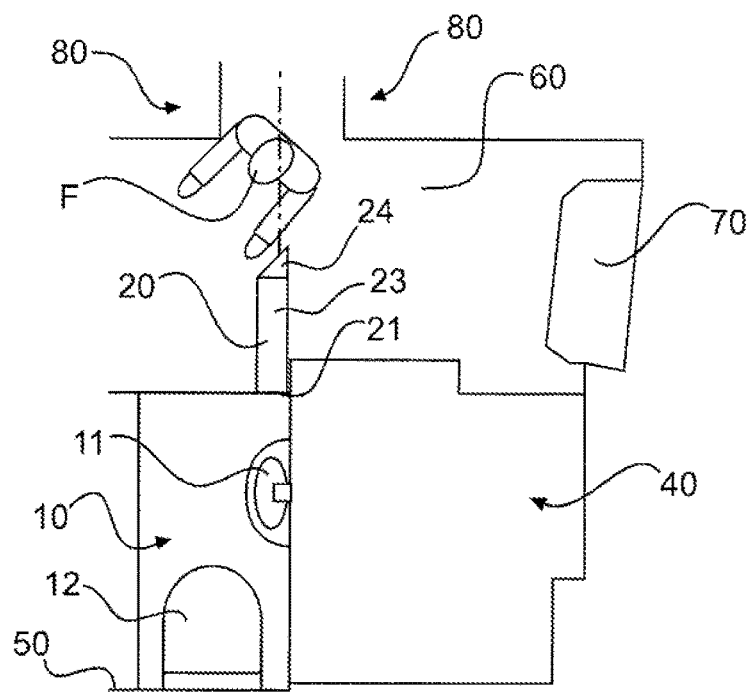
FIG. 2 shows a top view of part of a passenger cabin of an aircraft with a module in a schematic representation, wherein a user is standing.

FIG. 2 shows the same top view on part of the passenger cabin as on FIG. 1. As opposed to FIG. 1, the user or flight attendant F has left the seat 30 (not visible). The seat 30 is a folding seat, which was swiveled from its horizontal operating position into its perpendicular stowage position. The door 20 comprises a sufficient volume or thickness, so that the seat 30 is completely integrated into the door 20 when in the stowage position. In this way, the space in front of the door 20, i.e., the aisle 60, remains open and easily traversable even if the door 20 is opened. The user F has enough space to enter the module 10 around the open door 20 from all areas of the aisle 60. The door 20 comprises a structural profile with a lightweight construction, which comprises a rectangular profile 23 and a triangular profile 24, so that the longitudinal side of the door tapers acutely. Another advantage to this is that more space remains open and easily traversable in front of the door 20 and in the aisle passageway.

The additional module 40 is situated directly adjacent to the right of the module 10, on the side where a hinge component 21 is located. The additional module 40 projects relative from the module 10, preferably not at the full height, but rather only to such an extent as to form a countertop.

Figure 3:
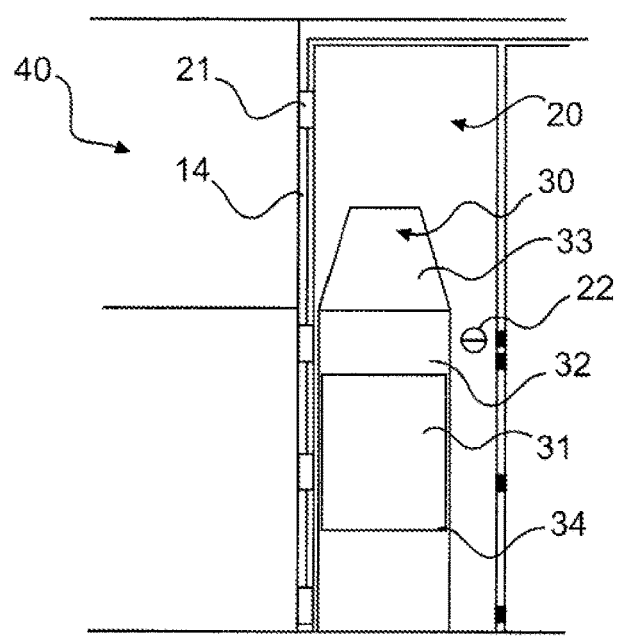
FIG. 3 shows a front view of a module with a door in a schematic representation.

FIG. 3 shows the closed door 20 of the module 10 from outside. The seat 30 on the door 20 comprises a folded-up seat surface 31, a backrest 32 and a headrest 33. The seat 30 can comprise seat belts. A hinge 34 runs parallel to the floor between the door 20 and seat 30. The door 20 can comprise a storage compartment in the space above the seat 30 that is not occupied by the seat. The storage compartment can be accessible from inside the module, and incorporate paper towels and/or integrated paper towel dispensers, for example.

For example, the door 20 comprises four hinge components 21 for interacting with other hinge components 15 that can be secured to the wall 14 of the module 10 or (not shown) to an adjoining wall of the adjacent additional module 40. The hinge components 21, 15 are distributed along the entire height of the door 20, so as to convey the torque from the total weight of the door 20, seat 30 and possibly seated user F to the wall 14 of the module 10 as uniformly as possible. The hinge components 21, 15 can be distributed uniformly over the height of the door 20 or, as depicted, be clustered in the area of the greatest application of force at the height of the seat 30. The door 20 further comprises an actuating element 22 in the form of a door handle with a recessed grip.

The seat 30 is laterally displaced from the center of the door 20 in the direction of the hinge components 21, thereby minimizing the lever arm of the weight of the seat 30 (and possibly a person F seated thereon), and thus the resulting torque on the hinge. Another advantage to the eccentric configuration of the seat 30 relative to the door 20 is that a seated flight attendant F can keep an eye on the passengers (so-called direct view), and other modules and fixtures 80 of the aircraft cabin do not block the line of sight (see by comparison FIG. 1).

Figure 4:
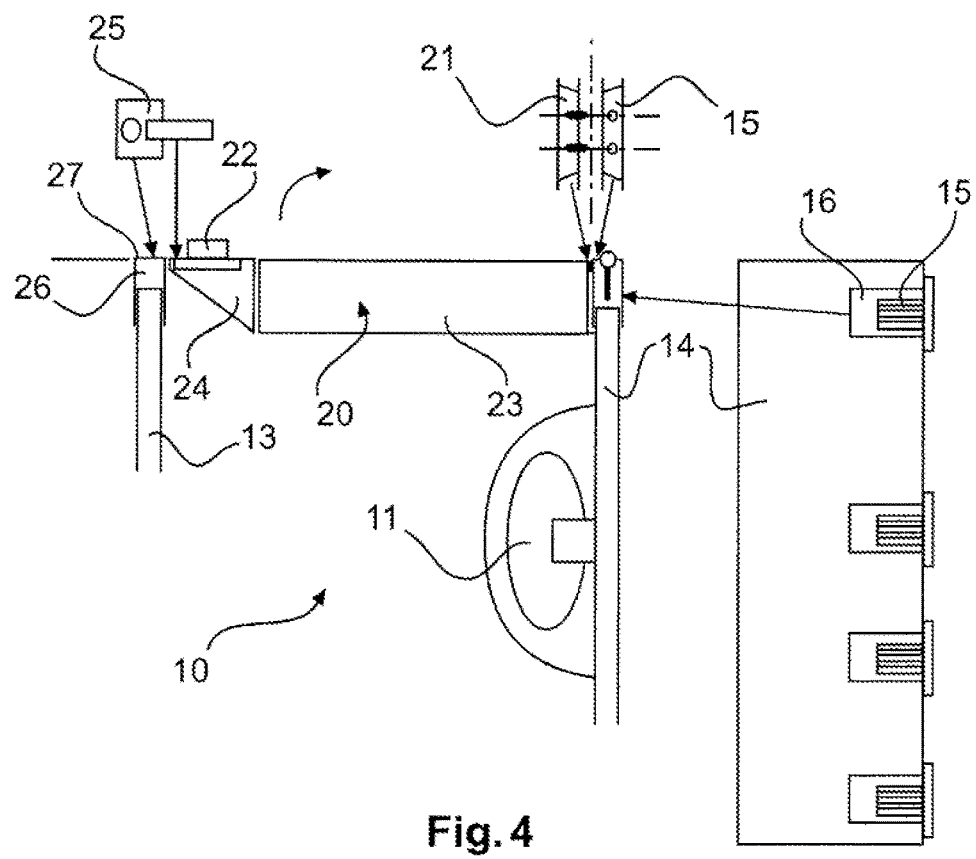
FIG. 4 shows a top view of a detail of the module in a schematic representation.

FIG. 4 shows a top view of a detail of the lavatory module 10 with special concentration on the door 20. The door 20 comprises the rectangular profile 23 with a certain volume or thickness so as to preferably completely accommodate the folded-up seat 30, so that the seat 30 does not impede passage through the aisle 60. The triangular profile 24 adjoins the rectangular profile 23, so that the door 20 acutely tapers. As shown on FIG. 2, the advantage to the acute or beveled taper of the door 20 is that more space remains open and thus easily traversable in front of the door 20 in the aisle 60. The triangular profile 24 of the door 20 comprises the actuating element 22 and a locking element 25. The locking element 25 can be a self-retaining lock, which can also be opened from outside in an emergency. The actuating element 22 and locking element 25 interact with a doorjamb 26, and there with a strike plate in the doorjamb 26 and/or module wall 13, for example which is integrated into the doorjamb 26 and/or module wall 13. An integral U-profile 27 on the doorjamb 26 prevents the doorjamb 26 from becoming distorted.

As shown in the detail view on FIG. 4, the door 20 comprises four hinge components 21 for interacting with accompanying hinge components 15 secured to the adjacent wall 14 of the module 10. The hinge components 21, 15 form a hinge, and are distributed along the entire height of the door 20, so as to convey the torque from the total weight of the door 20, seat 30 and possibly seated user F to the wall 14 of the module 10 as uniformly as possible. If the wall has a lightweight construction, for example, the pins of the hinge components 21, 15 can be secured in laminate blocks, which adjoin a honeycomb structure of the lightweight structure. The hinge comprises modular, flat adhesively bonded and/or bolted reinforcing bands 16, which introduce the force of the hinge components 21, 15 into the door 20 and/or into the wall 14 as uniformly as possible. Side band safeguards can be used for relieving the force.

For example, the actuating element 22, the locking element 25, the hinge components 21, 15, the reinforcing bands 16 and the side band safeguards are recessed into the door 20 or wall 14 or integrated therein completely or to the greatest extent possible, so as to economize on space and minimize the risk of injury. All mentioned components, the door 20 and the wall 14 can be reinforced in relation to the corresponding usual structural elements, so as to resist the influence exerted by the weight of the seat (and possibly a person seated thereon). For purposes of weight reduction or reinforcement, the door 20 and wall 14 can comprise stiffeners and recesses.

Figure 5A:
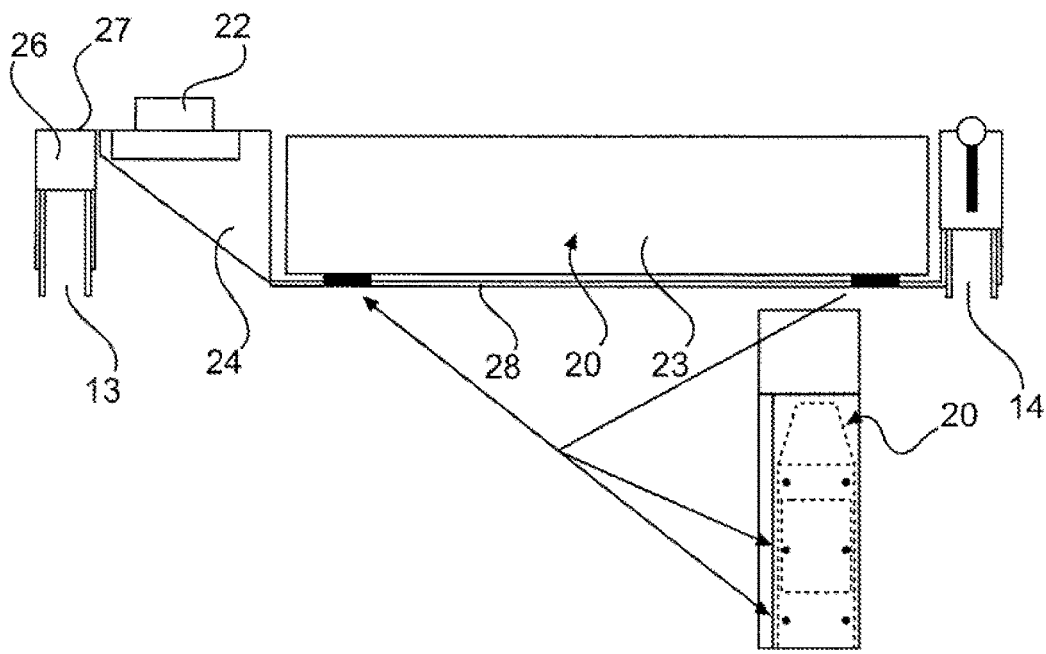
FIGS. 5a and 5b show a magnified detail of FIG. 4 in section and in a 3-D view.
Figure 5B:
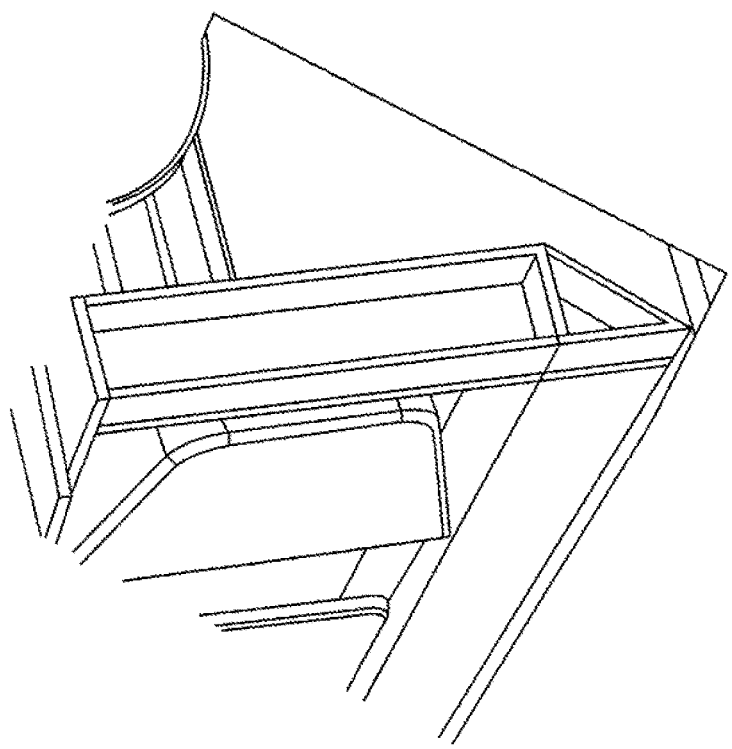

FIGS. 5a and b show a magnified detail of FIG. 4 with the components already described above. In addition, the door 20 comprises a receiving element 28 for the rectangular profile 23 and triangular profile 24. As viewed from outside the module 10, the receiving element 28 lies behind the rectangular profile 23 and triangular profile 24. For example, it is fastened to the rectangular profile 23 at six fastening points. The receiving element 28 further makes up an integral part of the triangular profile 24. The receiving element 28 is used for the transmission of force between the rectangular profile 23, the triangular profile 24, the door 20 and the walls 13, 14 of the module 10. An area-covering rib lies above and below the seat 30 so as to blanket the triangular profile 24 and receiving element 28.

Figure 6:
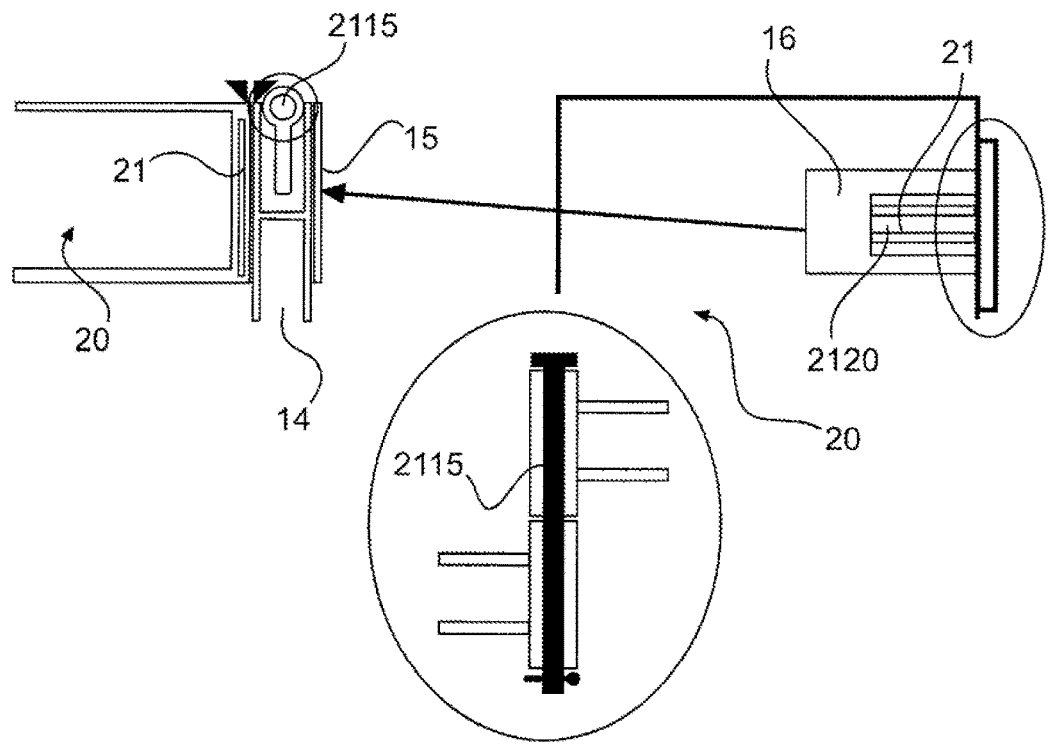
FIG. 6 shows another magnified detail of FIG. 4.

FIG. 6 shows another magnified detail of FIG. 4 with the components already described above. FIG. 6 presents a detailed view of the door 20 with the hinge component 21 for interacting with the accompanying hinge component 15, which is secured to the adjacent wall 14 of the module 10. The hinge comprises reinforcing bands 16, which introduce the force of the hinge components 21, 15 into the door 20 and/or into the wall 14 as uniformly as possible. The hinge components 21, 15 and reinforcing bands 16 are completely recessed into the door 20 or wall 14 or integrated therein so as to economize on space. For example, integration into the wall is accomplished with a reinforcing element, such as a laminate block 2120. A safeguard element, e.g., a pin 2115, running through the hinge components 21, 15 is removable in design, so that the door 20 can be unhinged from outside.

Figure 7:
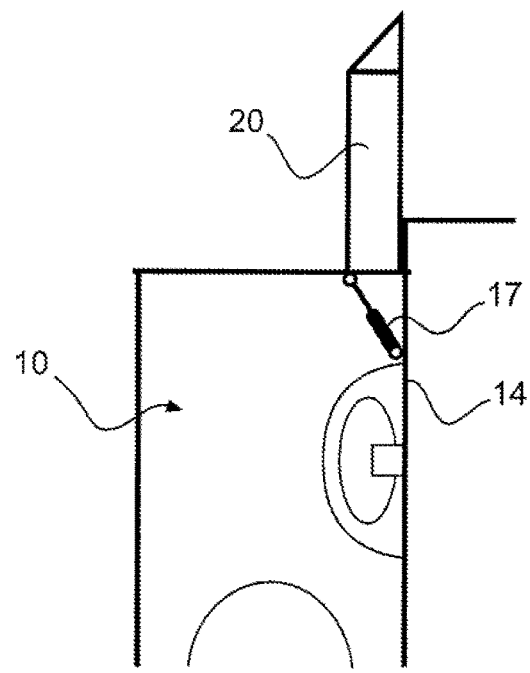
FIG. 7 shows a top view of part of a passenger cabin of an aircraft with a module in a schematic representation similar to FIG. 2.

FIG. 7 shows a view similar to that on FIG. 2. A door damper 17 is situated between the door 20 and wall 14 of the module 10.

Figure 8:
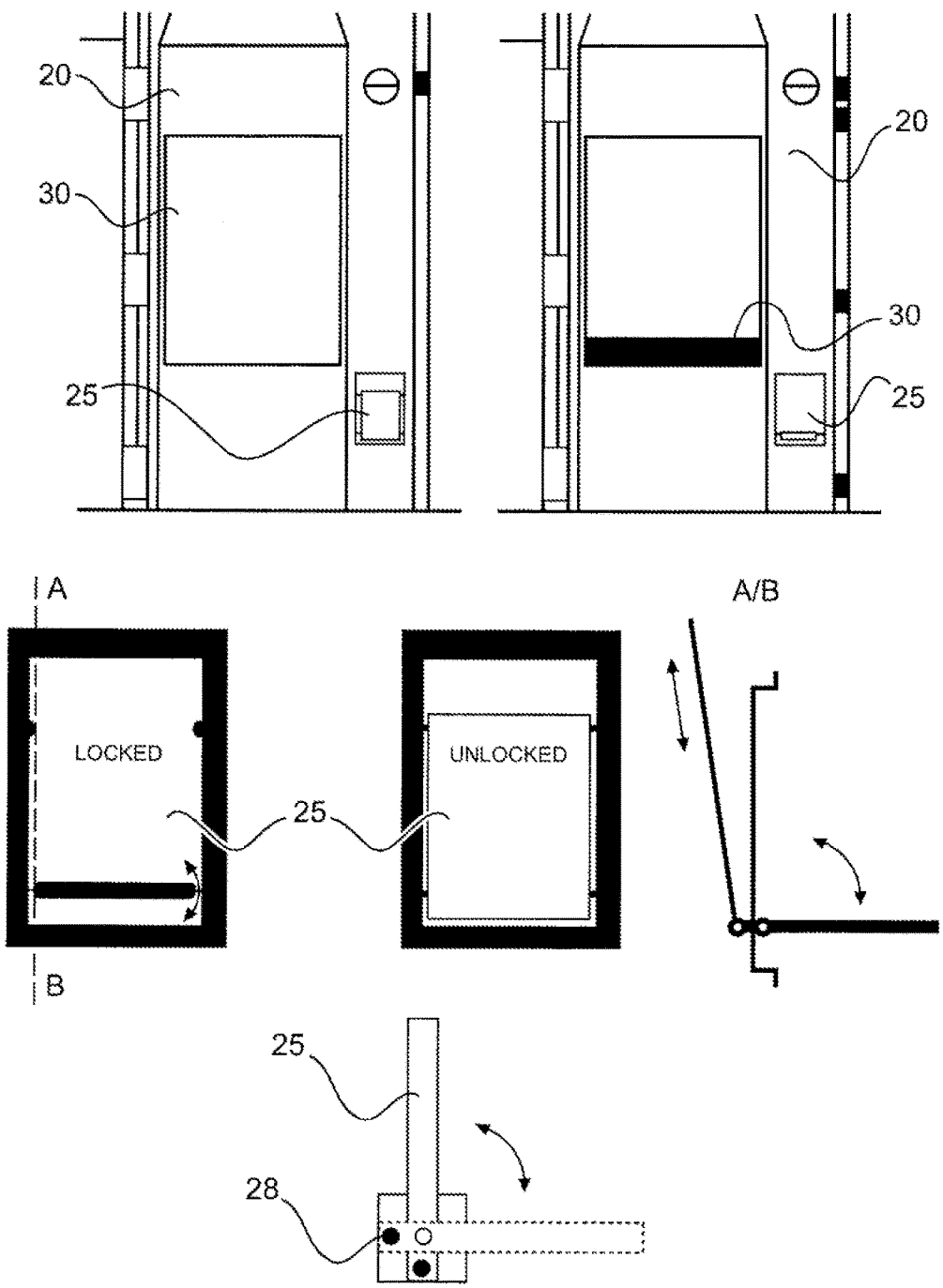
FIG. 8 shows several views of a locking element.

FIG. 8 shows an embodiment of the locking element 25. FIG. 8 presents two views of the door 20 from outside with the locking element 25 in the open (left) and closed (right) state of the locking element 25. An inscription or symbol for the open or closed states is preferably made visible when the locking element 25 is in the corresponding position. The locking element 25 can be intuitively operated with the hand or foot. If the locking element 25 if folded up (left), the door 20 is unlocked, and the seat 20 is folded up. If the locking element 25 is folded down (right), the door 20 is locked, and the seat is folded down and can be used.

The other details on FIG. 8 show the locking element 25 in the open (right) and closed (left) state, a section A/B through the locking element 25 with corresponding possible movements, and the locking element 25 with corresponding latching points 28 on a turning platform in the open and closed state. The grip of the locking element 25 to be actuated can control the accompanying locking mechanisms, or folding down the seat 30 in the operating position can control the locking mechanisms of the locking element 25 or even an additional locking device.

Figure 9:
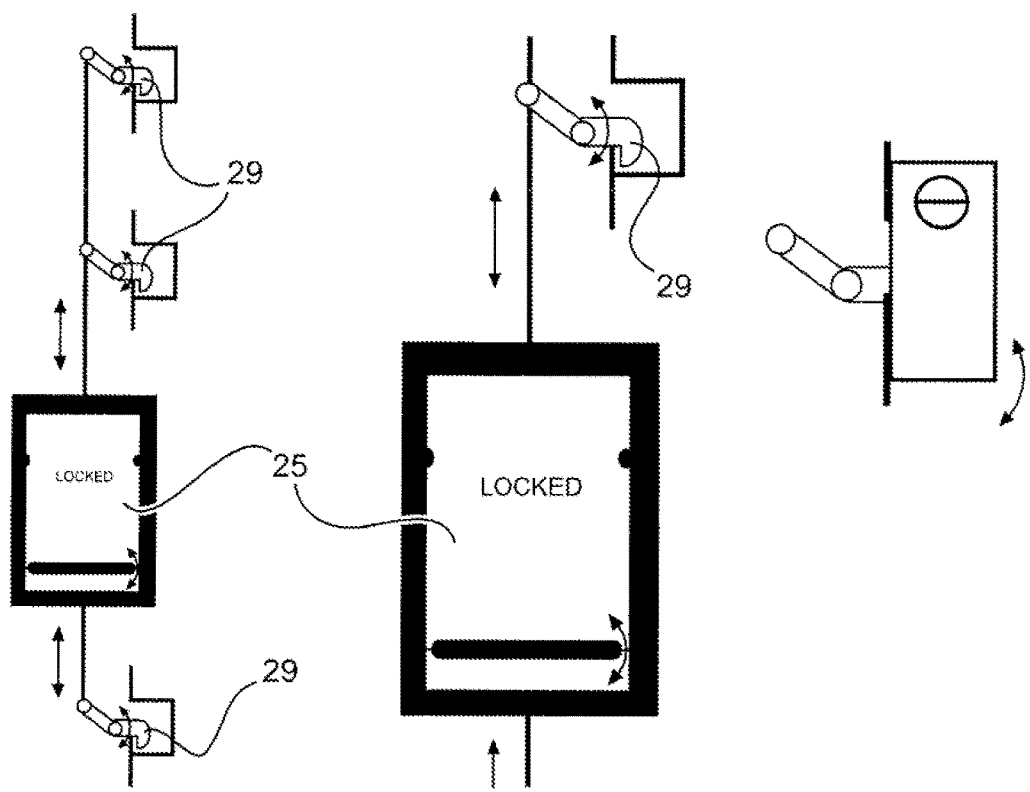
FIG. 9 shows several views of a swivel bolt.

FIG. 9 shows a swivel bolt 29 for use as an additional door locking mechanism of the locking element 25 to safeguard against loads, so as to prevent the doorjamb from buckling when exposed to a load.

Figure 10A:
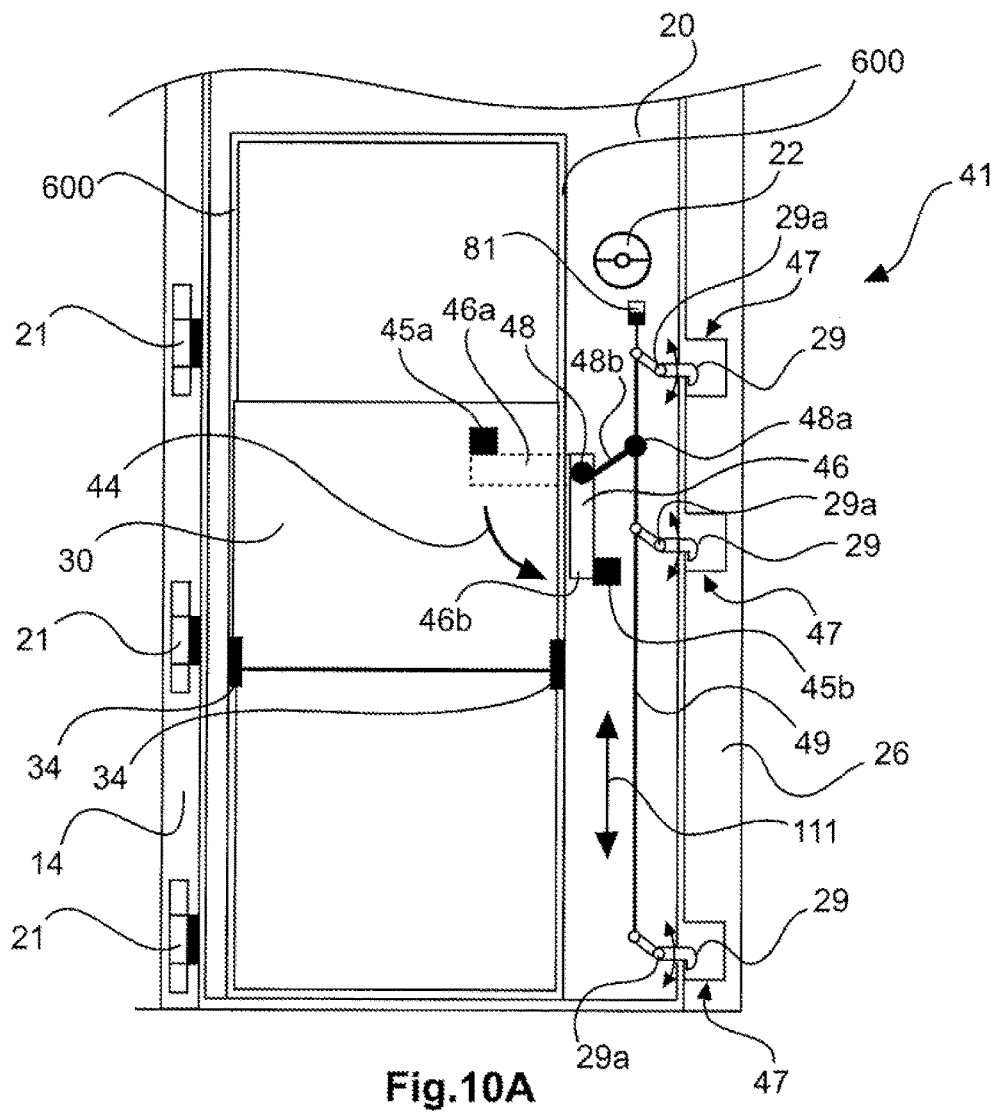
FIG. 10A shows a locking mechanism with locked door.

FIG. 10A shows a locking mechanism 41 with locked door 20, wherein the upper part of the door 20 is not depicted. A standard CAS or simply CAS (cabin attendant seat) can be a defined structural unit not to be adapted, which is fastened to the door 20 via mechanical interfaces, and comprises among other things a seat 30 or folding seat 30 that is connected with the CAS structural unit by a hinge 34. It is also possible to provide CAS configurations with electrical interfaces, for example an interface for a handset that comprises corresponding electrical connections like cables from the CAS to the module. The CAS can further comprise a stowage space with mechanical interfaces for CAS-specific equipment. Let it be noted that Standard CAS can also be referred to simply as CAS, and that a CAS or CAS structural unit represents a seat 30, or can comprise a seat 30, in particular a folding seat 30.

In particular, because it is hinged to the CAS or door 20, the seat 30 can be designed to be folded or swiveled from the perpendicular stowage position into the horizontal operating position and vice versa. For reasons of clarity, the seat 30 on FIG. 10A is shown in the perpendicular stowage position, so that an underside of the seat 30 can here be discerned. FIG. 10C shows the seat 30 in the horizontal operating position, i.e., in the folded out state. The door can be fastened to the wall 14 of the module 10 by hinge components 21. In the state depicted on FIG. 10A, the seat 30 is in the perpendicular stowage position. However, the seat 30 can be moved into the horizontal operating position, since a lever 46 is in an unlocked position 46*b*. The lever 46 can be mounted so that it can rotate around an axis 48 secured to the door leaf or door 20. For example, the lever 46 can be pre-tensioned by a pre-tensioning unit or a spring element, so that the lever 46 can only be actuated through exposure to a force. In other words, a force can be required to move the lever 46 from the locked position 46*a* of the folding seat 30 of the CAS shown dashed on FIG. 10A into an unlocked position 46*b* of the folding seat 30 of the CAS. For example, this actuation can be effected by a rotational motion 44 in the direction of the cabin floor. The spring element can be a torsion spring arranged around the rotational axis 48 of the lever. Stoppers 45*a* and 45*b* can be provided for locking the lever in the respective state.

A first connecting element 48*b* joins the lever 46 with a second connecting element 49. In particular, the second connecting element 49 is joined with the first connecting element 48*b* by a joint axis 48*a*, wherein the connecting element 48*b*, for example which is designed like a telescoping rod, is able to compensate for the change in length of the connecting element 48*b* caused by the sliding motion of the second connecting element 49 and a combination of kinematics comprised of a rotational motion and a sliding motion. The second connecting element 49 can be a rigid and/or oblong element, for example a push rod. It can be provided that the second connecting element 49 be able to perform a translational motion 111 in a vertical direction. This translational motion 111 is triggered by actuating the lever 48, which is functionally connected with the second connecting element 49 by way of the pre-tensioning unit and first connecting element 48*b*.

It can further be provided that a displacement caused by the rotational motion of the first connecting element 48 be absorbed by the second connecting element. The second connecting element 49 can here comprise a spring element for positioning the lever 46 in the stop positions given a corresponding configuration of the swivel bolt 29. As a consequence, a lateral or sideways displacement of the second connecting element 49 can also arise when actuating the lever 46. In particular, a superposition can be provided of the translational motion 111 and the lateral displacement of the second connecting element 49.

The vertically aligned second connecting element 49 can be provided with one or more bolts 29 spaced apart at the same or varying distances, which are each hinged to the second connecting element 49. The bolts 29 can further be mounted so that they can rotate around a rotational axis 29*a* secured to the door leaf, so that the bolts 29 can perform a swiveling motion around the rotational axis 29*a* owing to the translational motion 111 of the second connecting element 49. Therefore, the bolts 29 can be swivel bolts. These rotational axes 29*a* can be configured in such a way as to preclude a translational motion of the rotational axes 29*a* relative to the doorjamb 26 (a sectional view of which is provided on FIG. 10A). As a result, the bolts 29 mounted so that they can rotate around the rotational axes 29*a* can be made to engage into a respective recess 47 in the doorjamb 26 by the translational motion 111 of the second connecting element 49 as a function of the direction of the translational motion 111, in order to thereby secure and lock the door 20 during exposure to laterally and forwardly directed forces. It is also possible for the door 20 to be locked by the translational motion 111 of the second connecting element 49, including the swivel bolt 29, without a rotational motion of the bolts 29 taking place. FIG. 10A shows the door 20 in a locked state. As a result, the seat 30 can be swiveled into the horizontal operating position owing to the unlocked position of the lever 46. However, let it be noted that the seat 30 on FIG. 10A is only shown in the perpendicular stowage position by way of illustration. The recesses 47 can be situated at varying heights in the doorjamb 26, wherein the doorjamb 26 is aligned in the vertical direction, and hence essentially parallel to the second connecting element 49. The vertical direction or door jamb 26 thus runs parallel to the wall 14 of the module 10. As an option, a locking status display for the door 20 can be secured to the second connecting element 49 in the form of an indicator 81. This indicator 81 displays whether the door 20 is in a locked or unlocked state by having the indicator 81 visible from outside of the module 10 perform the translational motion 111, just like the second connecting element 49. In the configuration depicted on FIG. 10A, the indicator 81 displays the locked state of the door 20.

Figure 10B:
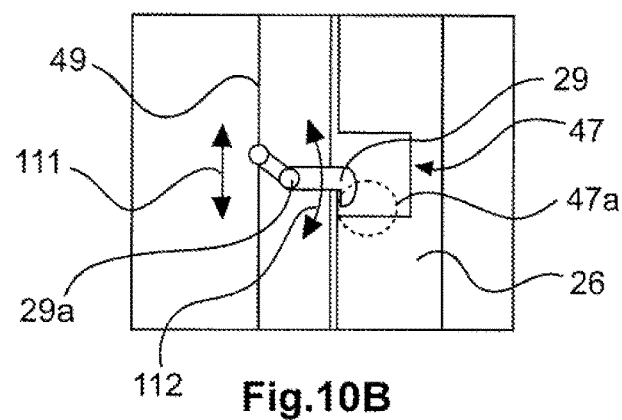
FIG. 10B shows a cutout of a bolt of a locking mechanism.
Figure 10C:
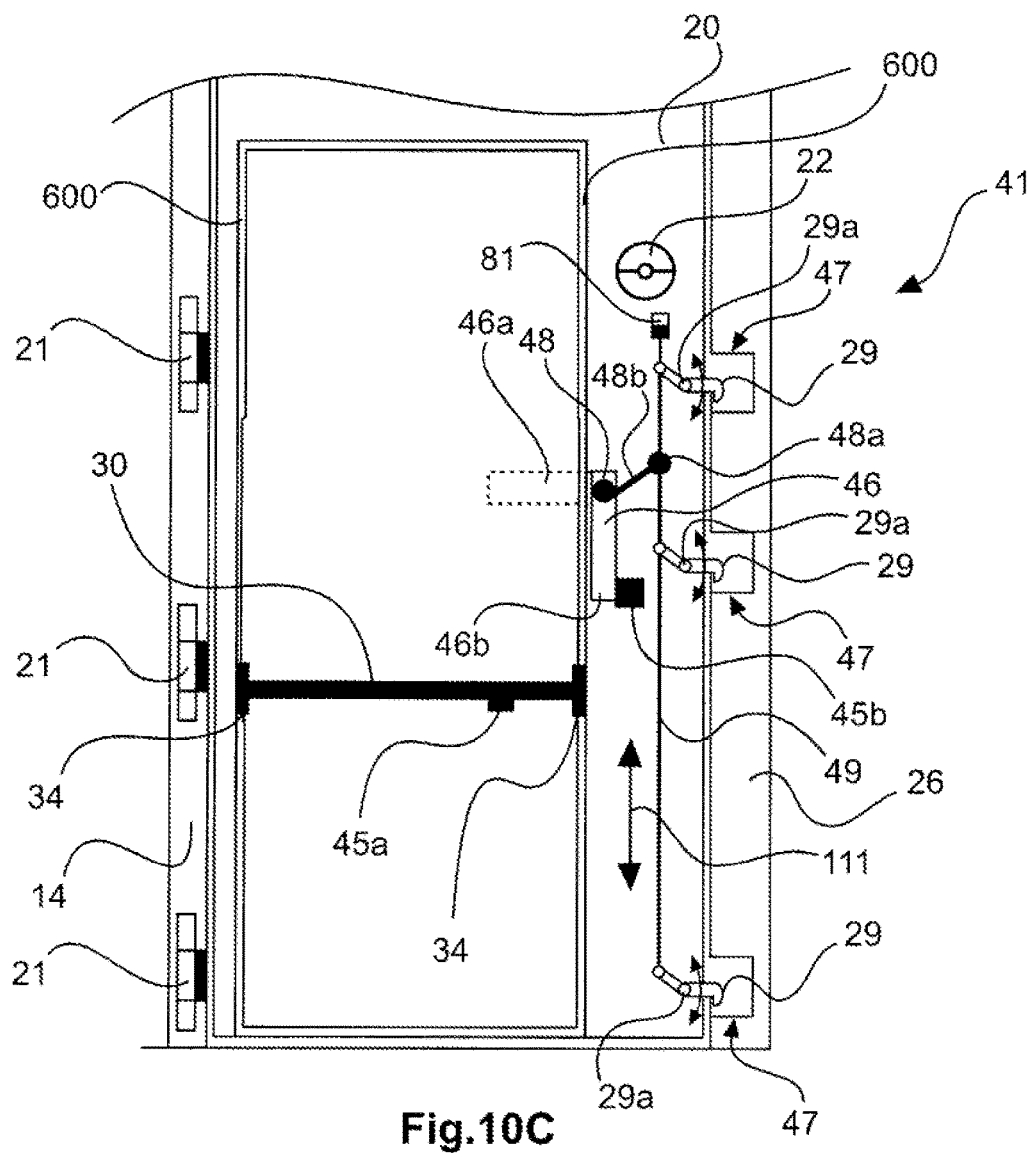
FIG. 10C shows a locking mechanism with locked door and folded out seat.

FIG. 10B shows a cutout of the locking mechanism 41 with the door 20 locked. In particular, the bolt 29 engages into the recess 47 of the doorjamb 26 (a sectional view of the doorjamb is provided), so that the door 20 not depicted here is in the locked state. The curved arrow denotes the rotational directions of the bolt 29 around the rotational axis 29a. The rotational motion 112 of the bolt 29 allows the bolt 29 to latch into or unlatch from the recess 47, so as to thereby lock the door 20. The rotational motion 112 of the bolt 29 is generated by the second connecting element 49 by moving the second connecting element 49 back and forth in the vertical direction, i.e., performing the translational motion 111. This translational motion 111 by the second connecting element 49 is in turn triggered by actuating the lever 46.

A locking status display for the door 20 can take the form of recesses or the form of viewing windows, holes or openings 47a in the area of the doorjamb 26. These viewing windows 47a are shown dashed on FIG. 10B, can be situated on a front side of the doorjamb 26 in relation to the viewing direction of a person standing in front of the module 10, and allow direct visual contact with the swivel bolt 29 in the locked position. The swivel bolt 29 can comprise a color marking denoting a positive locking. If the swivel bolt 29 is moved to the open position, the color marking is no longer visible, and indicates a defined state. The locking display for each swivel bolt 29 can advantageously ensure the transmission of force from each swivel bolt 29, and the seat 30 or CAS can continue to be used given a failure of a swivel bolt 29, for example, depending on the definition.

The locking mechanism 41 itself can be integrated or partially integrated into the door 20, or fastened to the door leaf, so that the latter is not visible from outside, i.e., from the aircraft cabin.

FIG. 10C shows the locking mechanism 41 with the door 20 locked, wherein the seat 30 is depicted in the folded out state, i.e., in the horizontal operating position. The seat 30 can here be folded out, since a lever 46 is in an unlocked position 46b.

Figure 10D:
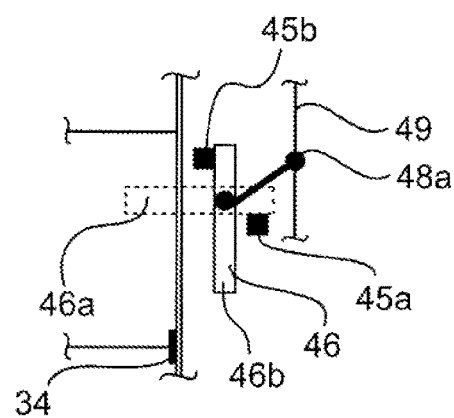
FIG. 10D shows a lever in an unlocked position and stoppers mounted to a door leaf.

FIG. 10D shows the lever 46 in an unlocked position 46b. In this configuration, the stoppers 45a and 45b are mounted to the door leaf and not to the underside of the seat 30 as shown in FIGS. 10A to 10C. The stoppers 45a and 45b are adapted for fixing the lever in the respective state, e.g., in a locked state or in an unlocked state. In this manner, the relevant components for locking the seat 30, e.g., for holding the seat 30 in the perpendicular stowage position, as well as other components, like for example interfaces, can be located and/or attached on the door leaf. The perpendicular stowage position can also be identified as the vertical stowage position. Thus, the seat 30 may be integrated into the door 20 without changing technical features of the seat 30 since all the components which are relevant for holding the seat 30 in the locked position, e.g., the when the seat 30 is in the perpendicular stowage position, may be located on the door leaf.

Figure 11A:
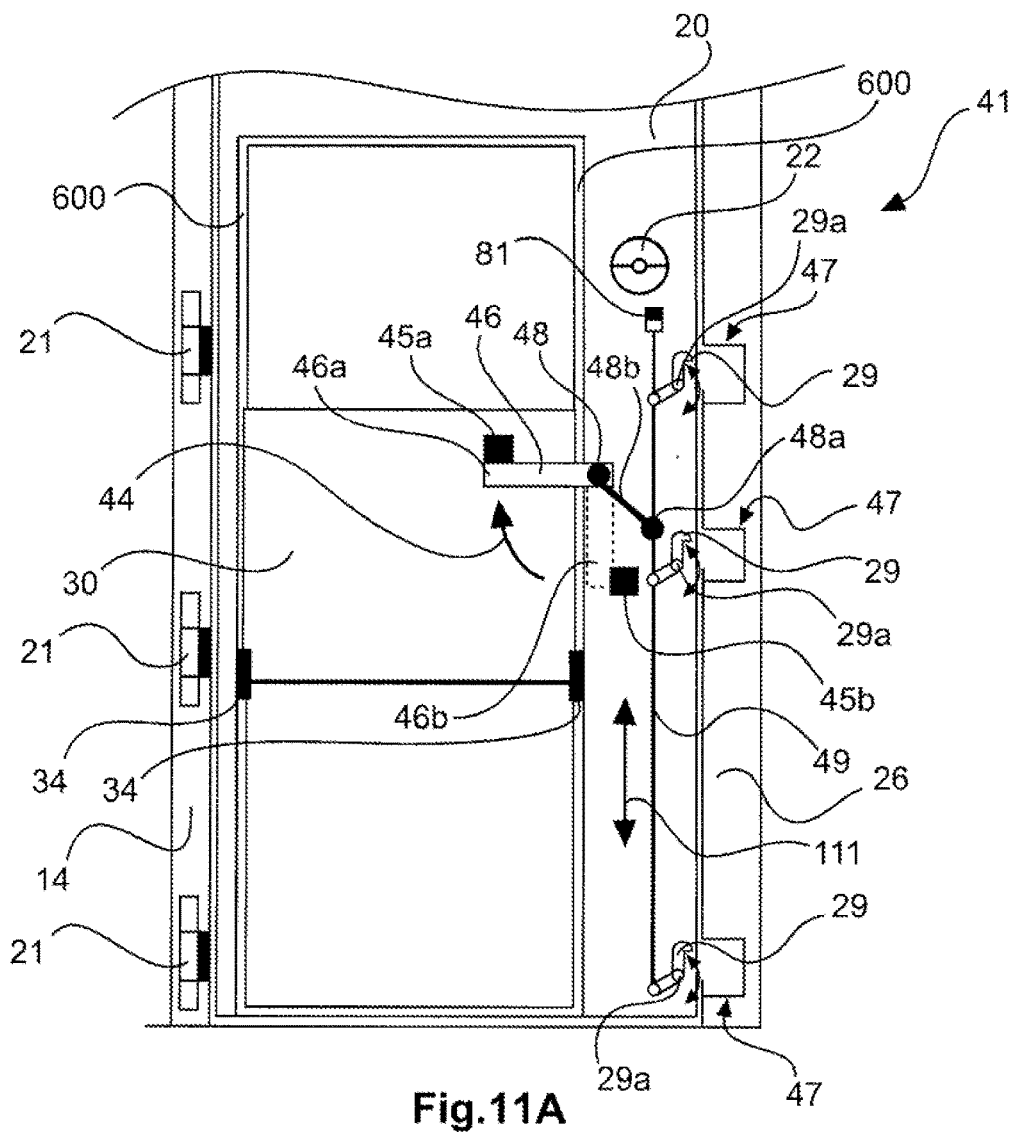
FIG. 11A shows a locking mechanism with unlocked door.

As opposed to FIG. 10A, FIG. 11A shows the locking mechanism 41 with the door 20 unlocked. In particular, it can be provided that the folding seat 30 must be moved into the perpendicular stowage position before the door 20 can be opened. In the case shown on FIG. 11A, the seat 30 cannot be moved into the horizontal operating position, since the lever 46 is in the locked position. Therefore, the seat 30 is in the vertical stowage position, so that the underside of the seat 30 is visible. In this case, a force is required to bring the lever 46 from the depicted locked position 46a of the seat into the unlocked position 46b of the seat 30, so that the seat 30 can again be folded out. For example, this actuation can be effected by the rotational motion 44.

Due to the actuation and resultantly completed realignment of the lever 46 into the locked position 46a of the seat 30, the translational motion 111 has displaced the second connecting element 49 in the direction of the cabin floor, in comparison to the state shown on FIG. 10A. As a consequence, the bolts 29 have rotated around the rotational axes 29a, and thereby unlocked the door 20. As evident from FIG. 11A, the bolts 29 have been unlatched from the respective recess 47, so that the door 20 can be opened. However, the seat 30 is simultaneously prevented from swiveling into the essentially horizontal operating position, since the lever 46 is in the locked position 46a. The indicator 81 fastened to the second connecting element 49 further displays the unlocked state of the door 20.

Figure 11B:
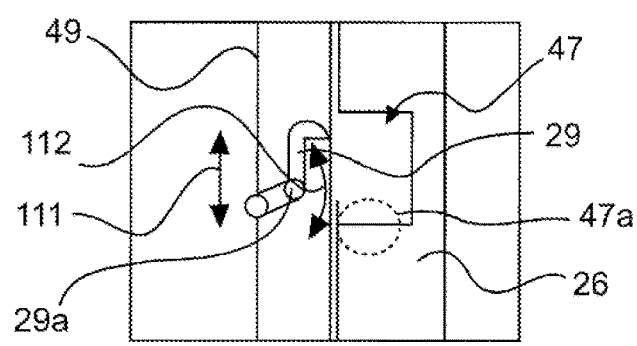
FIG. 11B shows a cutout of another bolt of a locking mechanism.

FIG. 11B shows a cutout of the locking mechanism 41 with the door 20 unlocked. The bolt 29 is here unlatched from the recess 47. The rotational motion 112 of the bolt 29 around the rotational axis 29a is caused by the translational motion 111 of the second connecting element 49. For example, the bolt 29 can take the form of a locking claw, which can be latched into a projection inside the recess 47 of the doorjamb 26 (shown in a sectional view). When the door 20 is open, i.e., when the swivel bolts 29 are unlatched, the swivel bolts 29 can be completely recessed in the door, so that the swivel bolts 29 disappear completely into the door leaf. This is especially important for personal protection.

Figure 12A:
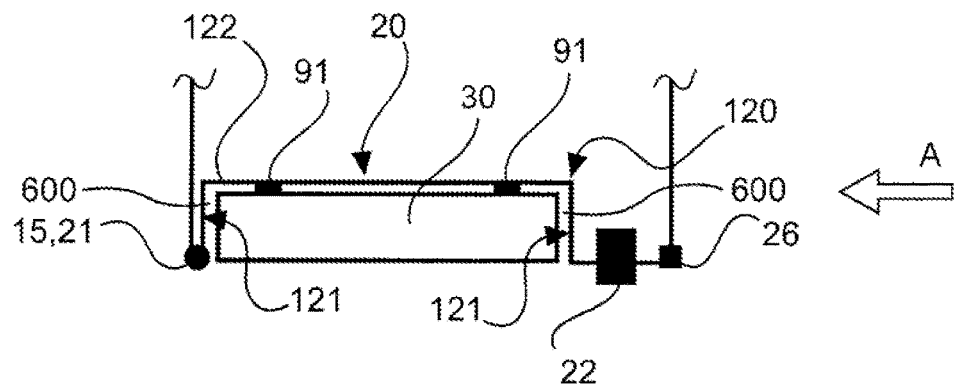
FIG. 12A shows a top view of a seat mounted flush in a pocket of the door.

FIG. 12A presents a top view of a seat 30 mounted flush in the door pocket 120 of the door 20. The door pocket 120 can be regarded as a depression in the door 20. The door pocket 120 comprises two lateral surfaces 121 parallel to the vertical direction, as well as a rear surface 122 also parallel to the vertical direction. The seat 30 is here at least partially or completely recessed in the door 20 or door pocket 120. If the seat 30 is only partially recessed in the door pocket 120, it can project about 1 cm out of the door 20 when it is in the vertical stowage position. For example, the seat 30 has a width of about 45 cm and a height of about 140 cm. The ratio of seat width to door width can measure about 0.7.

The seat 30 can further be detachably secured to the rear surface 122 of the door pocket 120 by mechanical retainers 91. It is also possible to provide electrical interfaces or data interfaces in the pocket 120, which connect the seat 30 or CAS with the avionics on the aircraft. In particular, ports for electrical devices along with mobile terminal devices can be provided on the seat 30 or CAS, so that a person seated on the folding seat 30 can use such devices.

Figure 12B:
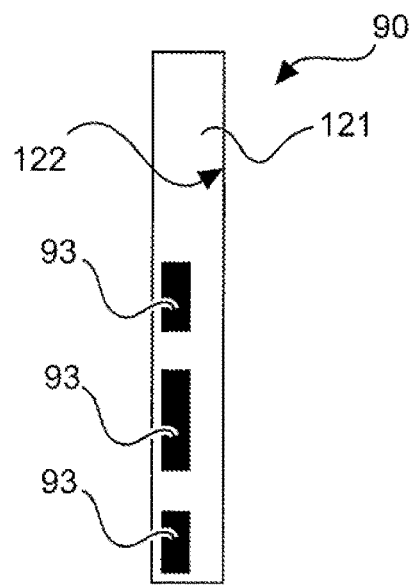
FIG. 12B shows a ventilating system of a module.

FIG. 12B shows a ventilating system 90 of the module 10 from the viewing direction A denoted by the arrow on FIG. 12A. The ventilating system 90 comprises several ventilating units 93. The configuration depicted on FIG. 12B shows three ventilating units 93. The ventilating units can be integrated in the door pocket 120 of the door 20. In particular, the ventilating units 93 can be provided in one of the lateral surfaces 121 or in both lateral surfaces 121 of the door pocket 120. As a consequence, the ventilating units are completely or partially covered by the seat 30 when the seat 30 or CAS is fastened in the door pocket 120. The seat 30 can have a smaller width than the door pocket 120, so that a gap 600 of the kind depicted on FIGS. 10A, 11A and 12A is arranged between the seat 30 or CAS and the lateral surfaces 121. The module 10 can be equipped with an air extractor, and draws in cabin air through the gap 600 and lateral ventilating units 93 of the door pocket 120. The percentage of openings in the ventilating units 93 with respect to the cross section can measure 1% to 2% of the surface area of the door leaf of the door 20. The openings in the ventilating units 93 can comprise a round, oblong or any other shape that is favorable in terms of production and aerodynamics.

Figure 13:
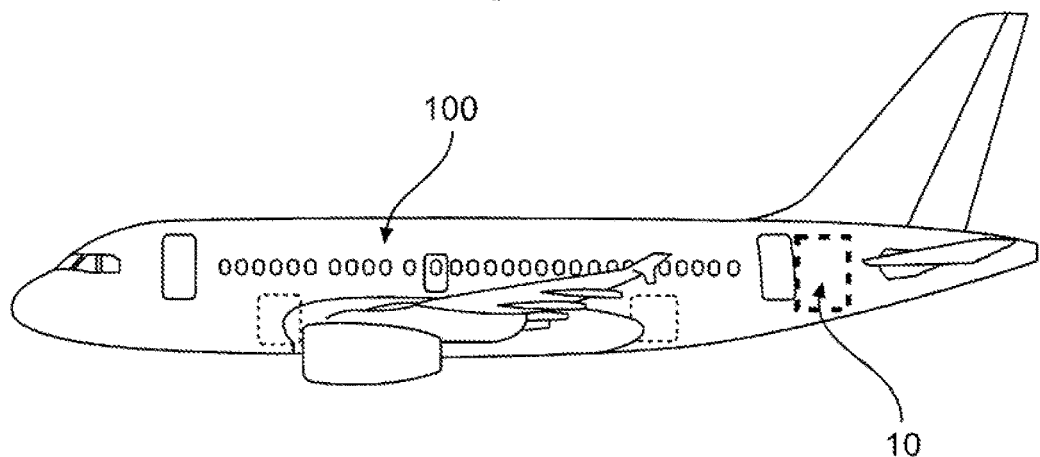
FIG. 13 shows a side view of an aircraft in a schematic representation.

FIG. 13 shows a side view of an aircraft 100 with a passenger cabin and the approximate position of the module 10, the rear side of which is nestled against a pressure bulkhead in the tail of the aircraft.

Let it additionally be noted that "comprising" does not preclude any other elements or steps, and that "a" or "an" does not preclude a plurality. Let it further be noted that features or steps that were described with reference to one of the above exemplary embodiments can also be used in combination with other features or steps from other exemplary embodiments described above. Reference numbers in the claims are not to be construed as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A module for an aircraft cabin, the module comprising:
a door to open the module; and
a seat fastened to the door;
wherein a seat surface of the seat is configured to swivel from an essentially perpendicular stowage position into an essentially horizontal operating position, and
wherein the module comprises a locking mechanism allowing the seat to swivel from the essentially perpendicular stowage position into the essentially horizontal operating position only when the door is locked.

2. The module of claim 1, wherein the seat is essentially recessed completely into the door when in the stowage position.

3. The module of claim 1, wherein the door comprises a hinge component for connection with a wall of the module, and the seat is laterally displaced from the center of the door in the direction of the hinge component.

4. The module of claim 1, wherein the door comprises at least one of stiffener and recesses.

5. The module of claim 1, wherein the door comprises at least one of an actuating element, a locking element, and a damper.

6. The module of claim 1, wherein the door comprises a storage compartment situated above the seat, and accessible from inside the module.

7. The module of claim 5, wherein at least one of the door, the hinge component, the actuating element and the locking element are reinforced.

8. The module of claim 1, wherein the module is a lavatory module, a urinal, a washroom, a closet, a relaxation room, or a staircase.

9. An aircraft with a passenger cabin, comprising a first module for an aircraft cabin, the first module comprising:
a door to open the module; and
a seat fastened to the door;
wherein a seat surface of the seat is configured to swivel from an essentially perpendicular stowage position into an essentially horizontal operating position, and
wherein the module comprises a locking mechanism allowing the seat to swivel from the essentially perpendicular stowage position into the essentially horizontal operating position only when the door is locked.

10. The aircraft of claim 9, wherein the side of the first module on which the hinge component is located is situated in the area of the longitudinal axis of the aircraft.

11. The aircraft of claim 9, further comprising a second module situated directly adjacent to the side of the first module, on the side of the first module on which the hinge component is located.

12. The aircraft of claim 11, wherein the second module projects at least partially relative to the first module.

13. The aircraft of claim 9, wherein the rear side of the first module is nestled against the pressure bulkhead in the tail of the aircraft.

* * * * *